(12) United States Patent
Tanaka et al.

(10) Patent No.: US 7,293,193 B2
(45) Date of Patent: Nov. 6, 2007

(54) ARRAY CONTROLLER FOR DISK ARRAY, AND METHOD FOR REBUILDING DISK ARRAY

(75) Inventors: Kazuyuki Tanaka, Tachikawa (JP); Takehiko Kurashige, Ome (JP)

(73) Assignee: Kabushiki Kaisha Toshiba, Tokyo (JP)

(*) Notice: Subject to any disclaimer, the term of this patent is extended or adjusted under 35 U.S.C. 154(b) by 554 days.

(21) Appl. No.: 10/945,261

(22) Filed: Sep. 21, 2004

(65) Prior Publication Data

US 2005/0097389 A1    May 5, 2005

(30) Foreign Application Priority Data

Sep. 30, 2003  (JP) ............................. 2003-339981

(51) Int. Cl.
*G06F 11/00*    (2006.01)

(52) U.S. Cl. ..................... 714/7; 714/8; 714/5; 714/6

(58) Field of Classification Search ................ 714/7, 714/8, 5, 6
See application file for complete search history.

(56) References Cited

U.S. PATENT DOCUMENTS

| | | | | |
|---|---|---|---|---|
| 5,390,187 A | * | 2/1995 | Stallmo | ................ 714/7 |
| 6,098,119 A | * | 8/2000 | Surugucchi et al. | ........ 710/10 |
| 6,598,174 B1 | * | 7/2003 | Parks et al. | .............. 714/6 |
| 6,636,984 B1 | * | 10/2003 | McBrearty et al. | .......... 714/6 |
| 2002/0152416 A1 | * | 10/2002 | Fukuda | ..................... 714/7 |

FOREIGN PATENT DOCUMENTS

JP    8221217    8/1996

* cited by examiner

*Primary Examiner*—Marc Duncan
(74) *Attorney, Agent, or Firm*—Pillsbury Winthrop Shaw Pittman, LLP

(57) ABSTRACT

An array controller includes a maximum address storage unit and a data restoration unit. The maximum address storage unit stores a maximum address, which is a maximum one of the addresses of data-written areas of the disk drives of a disk array. If one of the disk drives malfunctions, the data restoration unit generates data corresponding to the malfunctioning disk drive on the basis of the data stored in the first areas of the remaining disk drives and arranges the generated data in a second area. The second area corresponds to the first areas and is part of the new disk drive used in place of the malfunctioning disk drive. The first area is an area defined between the start address of the remaining disk drives and the maximum address stored in the maximum address storage unit.

4 Claims, 4 Drawing Sheets

ARRAY CONTROLLER FOR DISK ARRAY, AND METHOD FOR REBUILDING DISK ARRAY

CROSS-REFERENCE TO RELATED APPLICATIONS

This application is based upon and claims the benefit of priority from prior Japanese Patent Application No. 2003-339981, filed Sep. 30, 2003, the entire contents of which are incorporated herein by reference.

BACKGROUND OF THE INVENTION

1. Field of the Invention

The present invention relates to an array controller for controlling a disk array made up of a plurality of disk drives and having redundancy. More specifically, the present invention relates to an array controller and a disk array-rebuilding method, which are suitably used for rebuilding a disk array by replacing a malfunctioning disk drive, which is one of the disk drives of the disk array, with a new disk drive.

2. Description of the Related Art

RAID (Redundant Array of Inexpensive Disks, or Redundant Array of Independent Disks) is known as a technology for enhancing the reliability of data by use of redundancy data. In other words, RAID is a redundant disk array comprising a plurality of disk drives. With respect to the RAID, several RAID levels are defined, such as RAID1 (mirroring) and RAID5 (striping using parity). Each RAID level is known as a technology that restores data to its original state when one of the disk drives malfunctions. Therefore, data and redundancy data are arranged in the redundancy disk array without reference to the RAID level in use.

Let us consider the case where one of the disk drives constituting a redundancy disk array malfunctions. In such a case, the disk array is rebuilt in the manner disclosed in Jpn. Pat. Appln. KOKAI Publication No. 8-221217, for example. To rebuild the disk array, the malfunctioning disk drive must be replaced with a new disk drive. Then, the array controller (i.e., the RAID controller) starts rebuild processing. In this rebuild processing, data corresponding to all areas of the malfunctioning disk drive is restored to its original state in the new disk drive. Data stored in all areas of the normally-operating disk drives is used for that data restoration. The rebuild processing restores the redundancy of the disk array. In the case of a RAID1 disk array, for example, data corresponding to all areas of the existing drives is copied to a new disk drive. Since each of the disk drives constituting the disk array has an increased storage capacity, a very long time is required for rebuilding the disk array.

BRIEF SUMMARY OF THE INVENTION

An embodiment of the present invention concerns an array controller for controlling a disk array having redundancy. The disk array is made up of a plurality of disk drives. The array controller is provided with a maximum address storage unit and a data restoration unit. The maximum address storage unit stores a maximum address, which is a maximum one of the addresses of data-written areas of the disk drives. If one of the disk drives malfunctions and the disk array is rebuilt, the data restoration unit generates data corresponding to the malfunctioning disk drive on the basis of the data stored in the first areas of the remaining disk drives and arranges the generated data in a second area, which corresponds to the first areas and which is part of the new disk drive used in place of the malfunctioning disk drive. The first area is an area defined between a start address of the remaining disk drives and the maximum address stored in the maximum address storage unit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
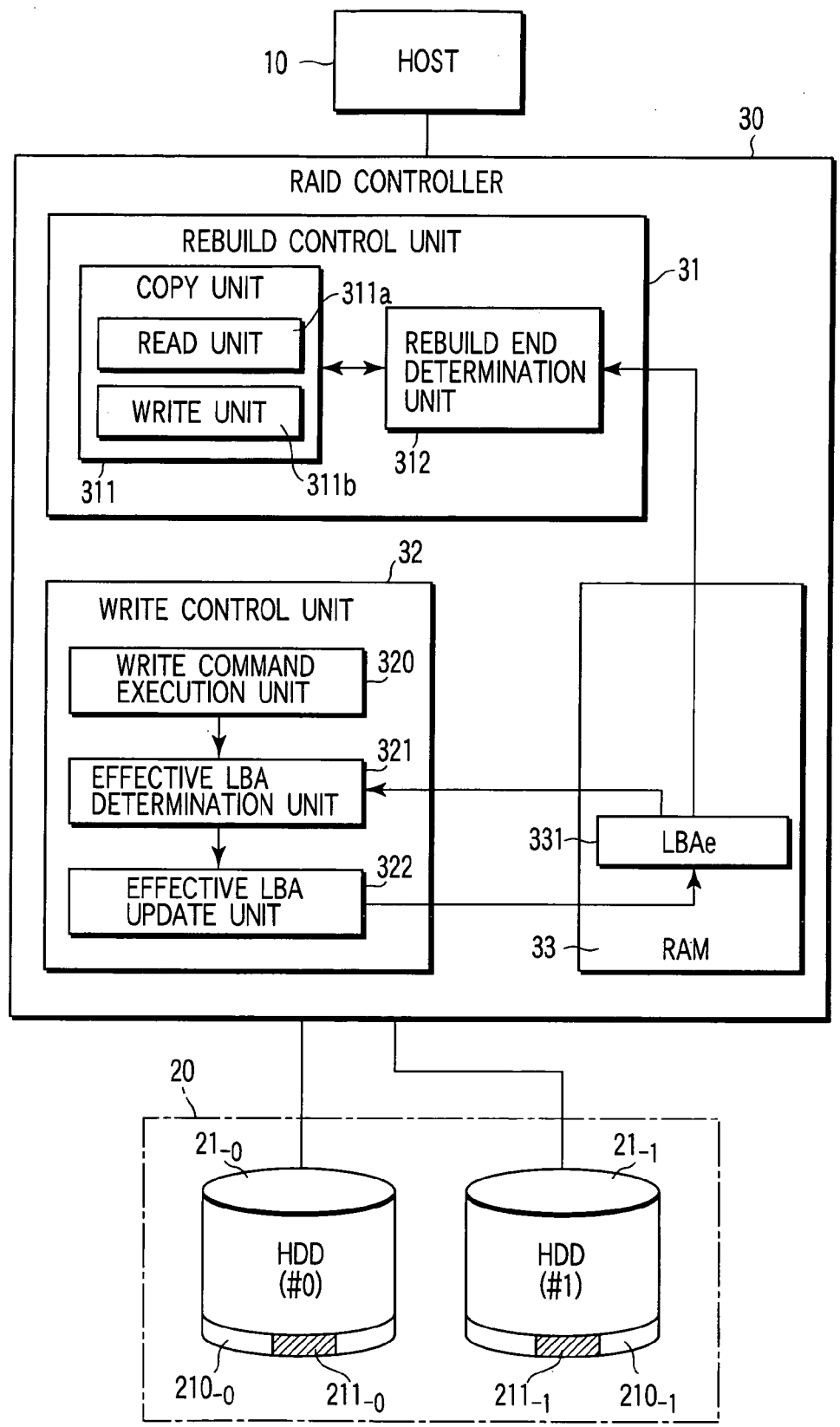
FIG. 1 is a block diagram showing a computer system according to one embodiment of the present invention.

One embodiment of the present invention will now be described with reference to the accompanying drawings. FIG. 1 is a block diagram showing a computer system according to one embodiment of the present invention. The computer system shown in FIG. 1 comprises a host (host computer) 10, a disk array 20 and an array controller (hereinafter referred to as "RAID controller") 30. The host 10 executes various kinds of applications. The disk array 20 is used as an external storage device of the host 10.

The disk array 20 is a RAID including a plurality of hard disk drives (hereinafter referred to as "HDD"), for example two HDDs 21-0 and 21-1. For the sake of simplicity, it is assumed that the HDDs 21-0 and 21-1 have the same storage capacity and the maximum logical block address LBA is FFFFh. The suffix "h" attached to "FFFF" indicates that "FFFF" is a hexadecimal value. The storage areas (disk areas) of HDDs 21-0 and 21-1 include reserve areas 210-0 and 210-1, respectively. These reserve areas 210-0 and 210-1 are determined beforehand and are areas the RAID controller 30 can use. The reserve areas 210-0 and 210-1 are provided in HDDs 21-0 and 21-1 in such a manner that their relative positions are the same. In the present embodiment, the reserve areas 210-0 and 210-1 are areas having the same size and defined by addresses closer to the final addresses. To be more specific, the reserve areas 210-0 and 210-1 are the same-size areas whose logical block addresses LBA are closer to FFFFh. The reserve areas 210-0 and 210-1 include effective LBA areas 211-0 and 211-1, respectively, and these effective LBA areas are used for storing effective LBAe, which will be described later.

The disk array 20 of the embodiment operates under the control of the RAID controller 30 and functions as a so-called mirroring disk array, i.e., a disk array to which RAID1 is applied. In the disk array 20 to which RAID1 is applied, the host 10 can recognize only one (first HDD) of the HDDs 21-0 and 21-1 of the disk array 20. The other HDD (second HDD) is used for retaining a copy of the data stored in the first HDD. The HDD the host 10 can recognize is referred to as a master HDD, while the HDD that retains a copy of the data stored in the master HDD is referred to as a backup HDD.

The RAID controller 30 controls the disk array 20. Where the disk array 20 functions as RAID1, the RAID controller 30 writes data requested by the host 10 in one of the HDDs 21-0 and 21-1 (i.e., the master HDD). Simultaneously, the RAID controller 30 writes a copy of the same data in the other HDD (i.e., the backup HDD) at a position whose relative position is the same as the master HDD.

The RAID controller 30 comprises a rebuild control unit 31, a write control unit 32 and a RAM 33. Part of the RAM 33 is assigned as a maximum logical block address area (hereinafter referred to as an effective LBA area) 331. The effective LBA area 331 is used as a storage unit for storing a maximum logical block address LBAe (hereinafter referred to as an effective LBAe), which is the maximum one of the logical block addresses LBA where data (block data) is written in the HDDs 21-0 and 21-1 of the disk array 20.

The rebuild control unit 31 controls the operation of rebuilding the disk array 20. The rebuild control unit 31 includes a copy unit 311 and a rebuild end determination unit 312. The copy unit 311 is actuated when the host 10 issues a command of rebuilding the disk array 20. The copy unit 311 makes a copy of the data of the normally-operating HDD, which is one of the HDDS 21-0 and 21-1 of the disk array 20, and stores that copy in a new HDD (hereinafter referred to as a target HDD), which is used in place of the malfunctioning HDD. The data is copied in units of one block, for example. In this manner, the copy unit 311 serves as a data restoration unit which restores the data of the malfunctioning HDD to the original state, using the data stored in the source HDD, and stores the restored data in the target. HDD. The copy unit 311 includes a read unit 311a and a write unit 311b. The read unit 311a reads data out of the source HDD in units of one block. The write unit writes the data, read out by the read unit 311a, in the target HDD in units of one block. The rebuild end determination unit 312 determines whether the copy operation the copy unit 311 performs in units of one block has proceeded to the block designated by the effective LBAe stored in the effective LBA area 331. If the copy operation performed in units of one block has proceeded to the block designated by the effective LBAe, the rebuild end determination unit 312 determines that the disk array 20 has been rebuilt.

The write control unit 32 controls the operation of writing data in the HDDs 21-0 and 21-1 of the disk array 20 in accordance with a write command the host 10 issues. The write control unit 32 includes a write command execution unit 320, an effective LBA determination unit 321 and an effective LBA update unit 322. The write command execution unit 320 executes a write command provided by the host 10. In the present embodiment, the write command execution unit 320 writes data requested by the write command in the master HDD, and writes a copy of that data in the backup HDD. The effective LBA determination unit 321 determines whether the logical block address LBAw designated by the write command is greater than the effective LBAe stored in the effective LBA area 331. If the effective LBA determination unit 321 determines that LBAw is greater than LBAe, the effective LBA update unit 322 updates the effective LBAe stored in the effective LBA areas 331, 211-0 and 211-1, by replacing them with LBAw.

Figure 2:
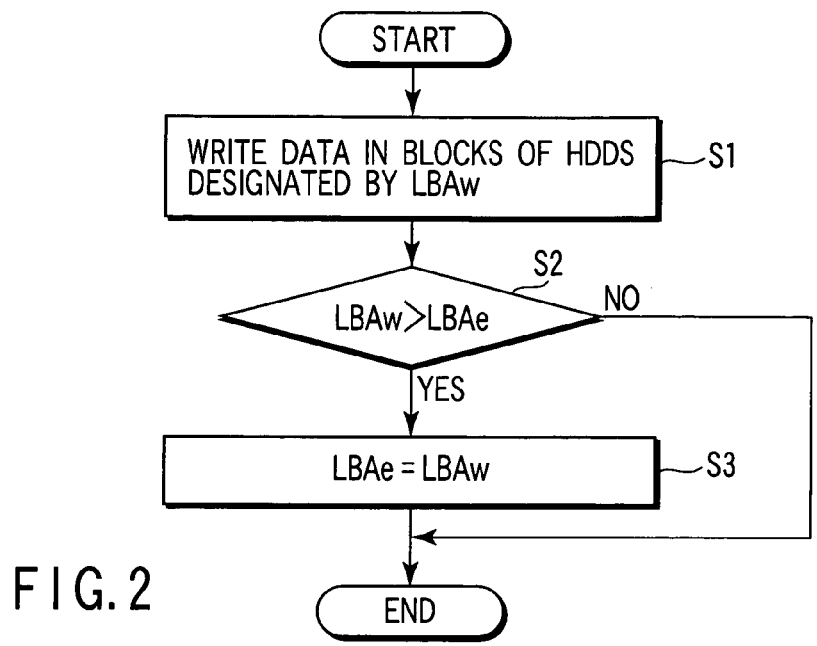
FIG. 2 is a flowchart illustrating operations performed when a host 10 issues a write command in the embodiment.

The operation of the computer system shown in FIG. 1 will be described, referring to the flowchart shown in FIG. 2. In the description below, reference will be made to the case where the host 10 issues a write command to the RAID controller 30. It is assumed here that the write command is a command for writing data in the HDD blocks designated by logical block address LBAw. It is also assumed that HDD 21-0 is used as a master HDD and HDD 21-1 is used as a backup HDD. It is further assumed that when the computer system shown in FIG. 1 is actuated, effective LBAe stored in both the effective LBA area 211-0 of HDD 21-0 and the effective LBA area 211-1 of HDD 21-1 is copied to the effective LBA area 331 of RAM 33. Also, it is assumed that when the computer system shown in FIG. 1 is actuated for the first time, initial value 0 (0000h) is set for the effective LBA areas 211-0 and 211-1 as an initial LBAe.

First of all, the write command execution unit 320 of the write control unit 32 of the RAID controller 30 writes the data designated by the write command issued by the host 10. The data is written in the block of the master HDD 21-0 designated by LBAw (Step S1). In step S1, the write command execution unit 320 writes the data, which is designated by the write command, in the block of the backup HDD 21-1 designated by LBAw. In other words, the write command execution unit 320 writes the data designated by the write command in both the blocks of the HDDs 21-0 and 21-1. In response to the data write operation based on the write command issued from the host 10, the effective LBA determination unit 321 of the write control unit 32 executes Step S2. In this step, effective LBA determination unit 321 compares the logical block address LBAw of the data-written block with the effective LBAe stored in the effective LBA area 331 of the RAM 33 (Step S2).

If LBAw is greater than LBAe, the effective LBA determination unit 321 determines that the effective LBA update unit 322 should perform control. In response to this determination, the effective LBA update unit 322 performs processing for updating the LBAe (step S3). To be more specific, the effective LBA update unit 322 updates the LBAe stored in the effective LBA area 331 secured in the RAM 33, by replacing the LBAe with LBAw. In addition, the effective LBA update unit 322 updates the LBAe stored in the effective LBA areas 211-0 and 211-1 secured in the reserve areas 210-0 and 210-1 of the HDDs 21-0 and 21-1, by replacing the LBAe with LBAw. In this manner, where LBAw>LBAe, LBAw is stored in the effective LBA areas 331, 211-0 and 211-1 as the newest effective LBAe. On the other hand, where LBAw is not greater than LBAe (i.e., LBAw≦LBAe), LBAe stored in the effective LBA areas 331, 211-0 and 211-1 is not updated.

Figure 4:
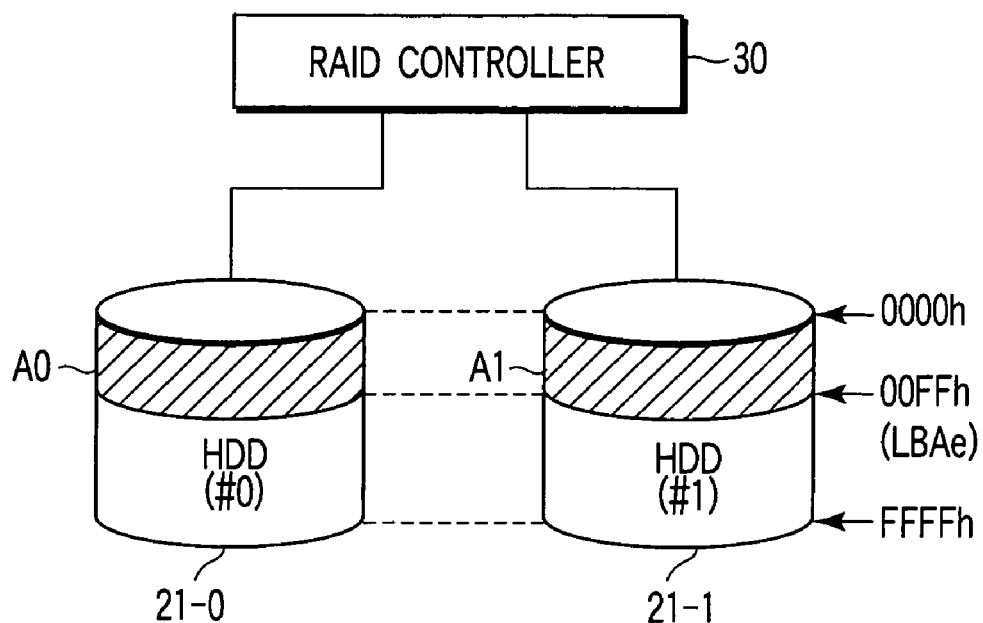
FIG. 4 illustrates relations between effective LBAe and effective data areas A0 and A1.

In the manner described above, the maximum logical block address LBA, which is a maximum one of the logical block addresses LBA representing data-written portions of HDDs 21-0 and 21-1, is stored in the effective LBA areas 331, 211-0 and 211-1 as effective LBAe. FIG. 4 shows how this effective LBAe is related to the effective data areas A0 and A1 which are part of HDDs 21-0 and 21-1 and in which data is already written.

Figure 3:
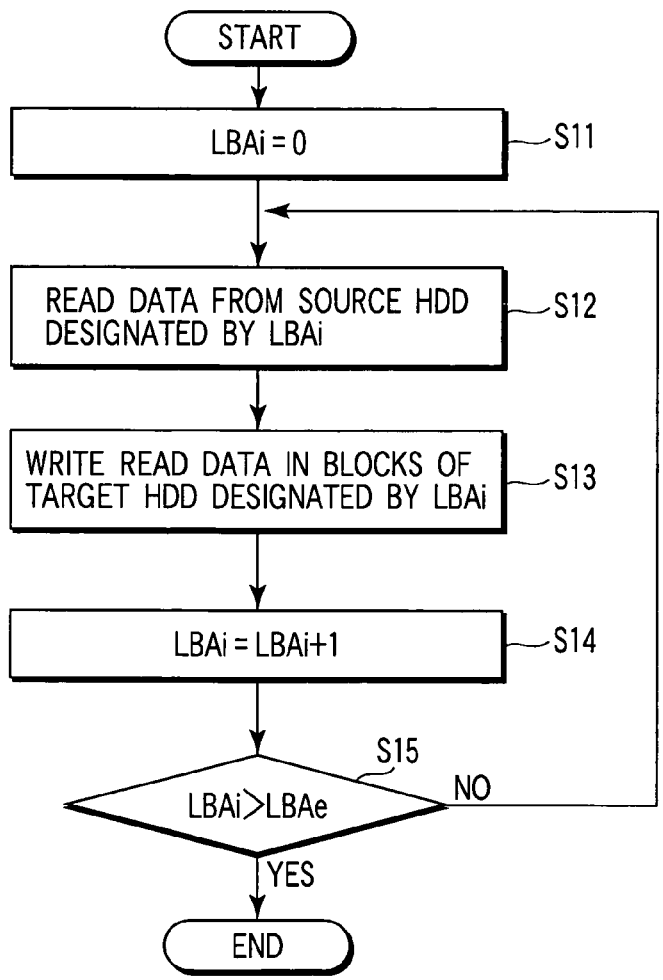
FIG. 3 is a flowchart illustrating operations performed when the disk array 20 of the embodiment is rebuilt.

The operation of the computer system shown in FIG. 1 will be described, referring to the flowchart shown in FIG. 3. In the description below, reference will be made to the case where the disk array 20 is rebuilt. It is assumed here that HDD 21-1, which is one of the hard disks constituting the disk array 20, malfunctions and is replaced with a new HDD. For the sake of simplicity, the new HDD used in place of the malfunctioning HDD 21-1 will be denoted by the same reference numeral as the original HDD 21-1. When the host 10 supplies the RAID controller 30 with a command for rebuilding the disk array 20, the rebuild control unit 31 of the RAID controller 30 is actuated. In the operation of building the disk array 20, the source HDD is the existing HDD 21-0, and the target HDD is the newly-used HDD 21-1.

When the rebuild control unit 31 is actuated, the copy unit 311 of the rebuild control unit 31 sets the logical block address LBAi at initial value 0 (Step S11). In response to this, the read unit 311a of the copy unit 311 reads the data stored in the area (block) of the source HDD 21-0 designated by LBAi (Step S12). The write unit 311b of the copy unit 311 writes the data, which the read unit 311a reads from the source HDD 21-0, in the area (block) of the target HDD 21-1 designated by LBAi (Step S13). As a result, the data stored in the source HDD 21-0 and designated by LBAi is copied to that block of the target HDD 21-1 designated by the same LBAi. In the disk array 20 of the present embodiment to which RAID1 is applied, the data stored in the block of the source HDD 21-0 designated by LBAi is equivalent to the data stored in the block of the malfunctioning HDD 21-1 designated by LBAi. Therefore, the data in the malfunctioning HDD 21-1 can be restored to the original state in the target HDD 21-1 by copying data from the source HDD 21-0 to the target HDD 21-1.

Next, the copy unit 311 increments the LBAi by "1" so that it represents the logical block address of the next copy source and copy destination (Step S14). Then, the copy unit 311 gives control to the rebuild end determination unit 312. In response, the rebuild end determination unit 312 compares the incremented LBAi with the effective LBAe stored in the effective LBA area of the RAM 33 (Step S15).

If the incremented LBAi is smaller than LBAe or equal to it, this means that the incremented LBAi belongs to the effective data area (the first area) A0 of the HDD 21-0. Where LBAi≦LBAe, the rebuild end determination unit 312 determines that the operation of rebuilding the disk array 20 has not yet been ended and should be continued. In this case, the rebuild end determination unit 312 causes the copy unit 311 to continue the data copying operation, i.e., the operation of copying data from the effective data area A0 of the source HDD 21-0 to the corresponding area (the second area) of the target HDD 21-1. Thus, the copy unit 311 continues the operation of copying data from the source HDD 21-0 to the target HDD 21-1, using the incremented LBAi (Steps S12 and S13).

If the incremented LBAi is larger than LBAe, this means that the incremented LBAi does not belong to the effective data area A0 of the HDD 21-0. Where LBAi>LBAe, the rebuild end determination unit 312 determines that the operation of rebuilding the disk array 20 has been ended. In this case, the rebuild end determination unit 312 informs the copy unit 311 that the operation of rebuilding the disk array 20 has been ended. As a result, the copy unit 311 stops the operation of copying data from the source HDD 21-0 to the target HDD 21-1.

Figure 5:
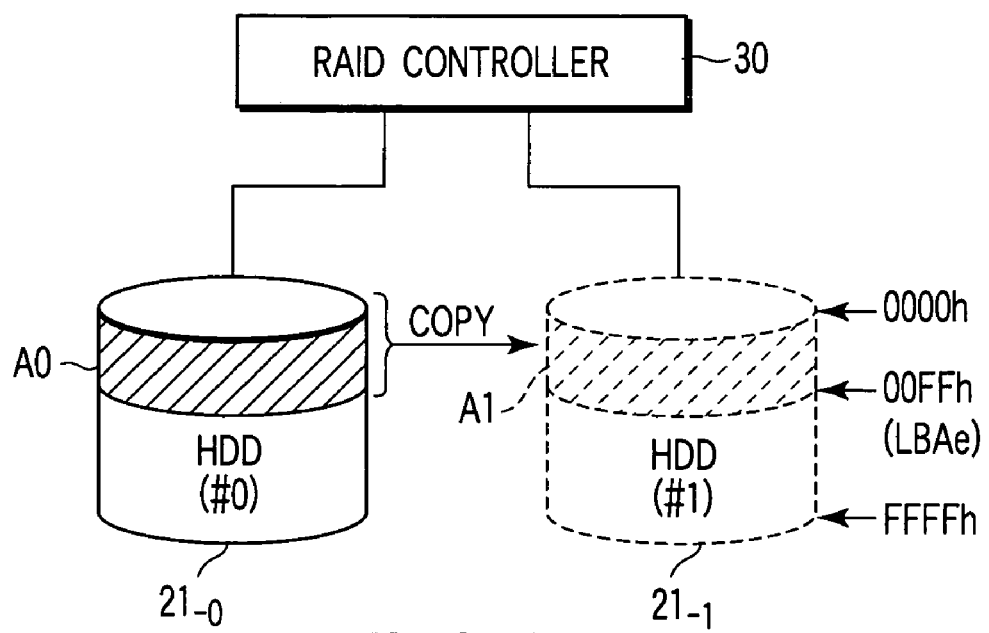
FIG. 5 illustrates how the data in effective data area A0 of source HDD 21-0 is copied to target HDD 21-1 when the disk array 20 is rebuilt.

As shown in FIG. 5, the copy unit 311 performs a data copying operation for copying the data from the effective data area A0 of the source HDD 21-0 to the corresponding area A1 of the target HDD 21-1. The data copying operation includes: the operation of sequentially reading the data from the effective data area A0 of the source HDD 21-0 in units of one block; and the operation of sequentially writing the read data in the area A1 of the target HDD 21-1 in units of one block. The effective data areas A0 and A1 of the HDDs 21-0 and 21-1 are areas defined from LBAi=0 (0000h) to LBAi=LBAe (00FFh). In comparison with the case where the data in all areas of HDD 21-0 is copied (and restored) to HDD 21-1, the data copying operation (data restoring operation) described above is advantageous in that the copying time (rebuilding time) is as short as possible. In addition, the management is simple and easy because what is required is to store only the maximum logical block address (which is a maximum one of the logical block addresses indicating the (block) data-written areas of HDD 21-0) as effective LBAe. If only effective data is copied (restored) from HDD 21-0 to HDD 21-1, discrete access has to be performed many times, degrading the disk access efficiency. In addition, the management of the effective data is complex.

In the present embodiment, the data in the reserve area 210-0 of HDD 21-0 is copied to the reserve area 210-1 of HDD 21-1. These reserve areas 210-0 and 210-1 may be provided in those areas of HDDS 21-0 and 21-1 which are closer to the top addresses (i.e., LBA=0 (0000h)). If a nonvolatile memory can be provided inside the RAID controller 30, the effective LABe described above may be written in part of the nonvolatile memory. In this case, the reserve areas 210-0 and 210-1 need not be provided with effective LBA areas 210-0 and 211-1, respectively.

In the embodiment described above, the maximum logical block address (which is a maximum one of the logical block addresses indicating the (block) data-written areas of HDDs 21-0 and 21-1) is stored and managed as effective LBAe. Instead of this, the logical block address may be rounded based on the predetermined unit (i.e., 10 MB), and the rounded logical block address may be used to manage effective LBAe', in place of the effective LBAe described above. Let us assume that the rounded logical block address corresponding to the written logical block address LBAw is LBAw' and that the rounded maximum logical block address is LBAw'. In the processing corresponding to Step S2 LBAw' and LBAe' are compared with each other. Only when LBAw'>LBAe', is LBAe' updated to LBAw'. By so doing, the number of times LBAe' is updated can be reduced. The effective data area may have to be increased in accordance with the rounding unit.

[Modification]

Figure 6:
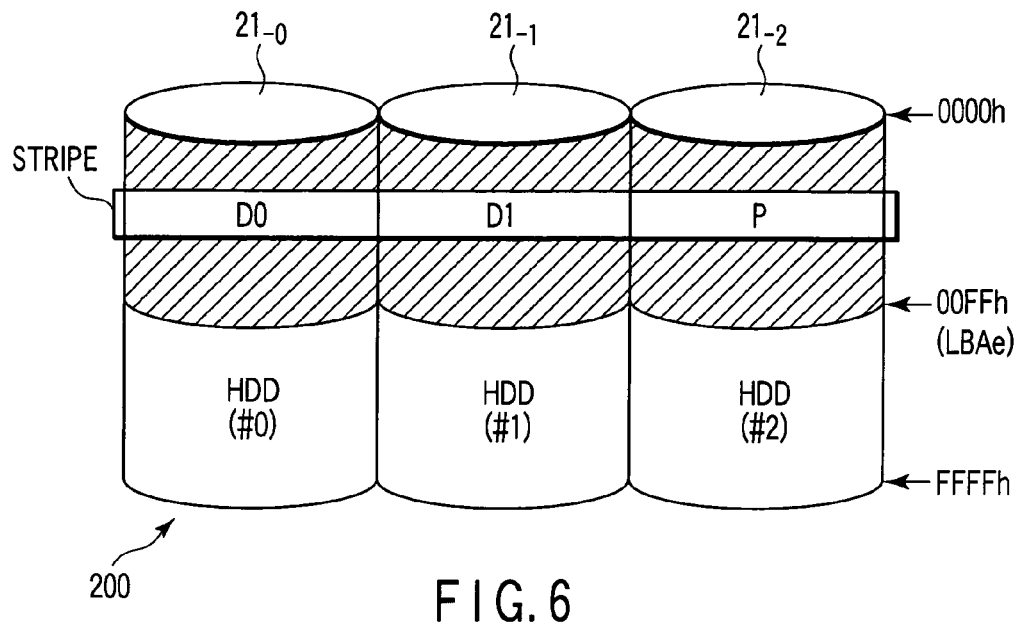
FIG. 6 illustrates a disk array 200 which is according to a modification of the above embodiment and which is used in place of the disk array 20 shown in FIG. 1.

In the above embodiment, the disk array 20 is made up of two HDDs 21-0 and 21-1, and functions as a disk array based on RAID1 (i.e., a mirroring disk array). Needless to say, the number of HDDs constituting the disk array may be three or more, and the RAID level is not limited to RAID1. A description will therefore be given of a modification of the above embodiment, wherein the disk array 200 shown in FIG. 6 is employed in place of the disk array 20 shown in FIG. 1. The descriptions below will be given with reference to FIG. 1.

The disk array 200 shown in FIG. 6 is made up of three HDDs 21-0, 21-1 and 21-2. It is assumed here that the disk array 200 is of RAID5 level. HDDs 21-0, 21-1 and 21-2 are used for storing data and parity data (redundant data). Parity data is stored in HDDs 21-0 to 21-2 in a distributed fashion. Where the disk array 200 is used as an array of RAID3 level, two of the HDDS 21-0 to 21-2 are used for storing data (they are used as data disks), and the remaining one is used for storing parity data (it is used as a parity disk).

The disk areas of the disk array 20 made up of HDDs 21-0 to 21-2 are divided into stripes for management, as shown in FIG. 6. The stripes are block areas of HDDS 21-0 to 21-2 that are identical in light of their relative positions. For the sake of simplicity, one stripe is defined by one block of each of the HDDs 21-0 to 21-2. In other words, one stripe is defined by three blocks. The blocks of two of the HDDS 21-0 to 21-2 store data D0 and data D1. The block of the remaining HDD stores parity data P corresponding to data D0 and data D1.

With respect to the system that employs the disk array 200 shown in FIG. 6 in place of the disk array 20 shown in FIG. 1, let us assume that data D0 (or D1) is to be updated to data D0' (or D1') in response to a write command issued by the host 10. In this case, data D0 (or D1) is updated to data D0' (or D1'). Likewise, parity data P is updated to parity data P' corresponding to data D0' and data D1 (alternatively, data D0 and data D1'). A description of the method for generating the parity data P' will be omitted herein because the method does not have direct relationships with the present invention.

Even where the computer system of FIG. 1 employs disk array 200 in place of disk array 20, effective LBAe is updated (in response to the write command issued from the host 10 to the RAID controller 30) in a similar manner to that described above in connection with the foregoing embodiment. If one of the HDDs 21-0 to 21-2 of the disk array 200 malfunctions, the data of the remaining two HDDs is used for restoring the data and parity data of the malfunctioning HDD to their original state in units of one stripe. In some cases, the blocks (a group of blocks) which are part of the HDDs 21-0 to 21-2 and which are identical in relative position are referred to as a stripe, and a plurality of such stripes are referred to as a stripe group.

Figure 7:
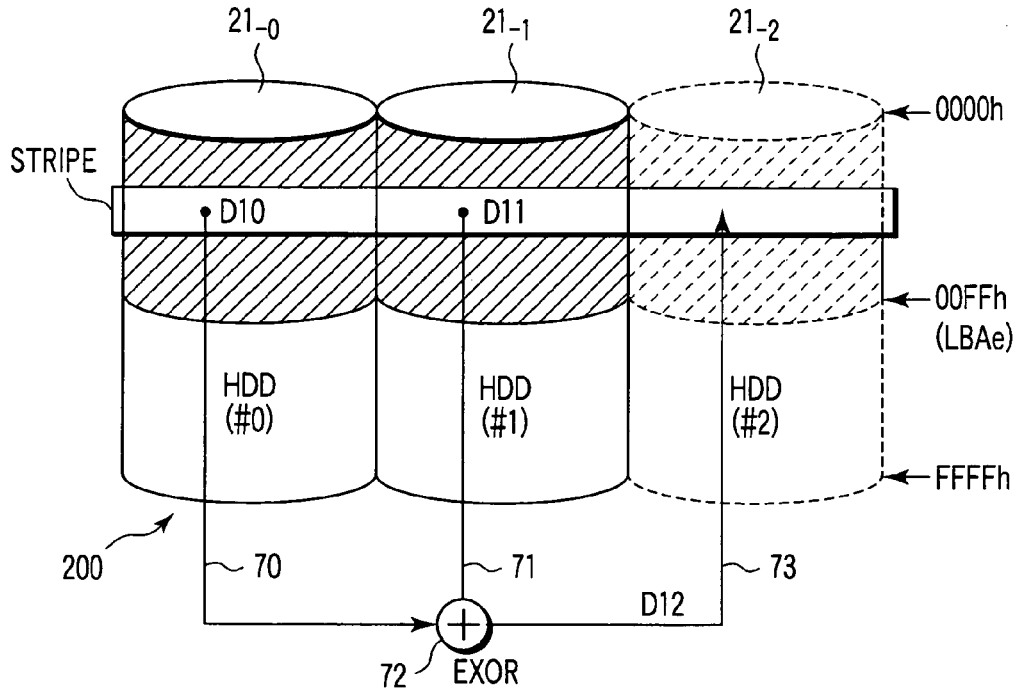
FIG. 7 illustrates data restoring processing executed when the disk array 200 of the modification is rebuilt.

FIG. 7 illustrates data restoring processing executed when the disk array 200 of the modification is rebuilt. The processing illustrated in FIG. 7 is executed, for example, in the case where HDD 21-2 of the disk array 200 malfunctions and is replaced with a new HDD 21-2 (to which the same reference numeral as the malfunctioning HDD is assigned for the sake of simplicity). In this case, the data restoring processing (which restores the data in the malfunctioning HDD 21-2 to the original state on the basis of the data stored in the HDDs 21-0 and 21-1, and which writes the restored data in the new HDD 21-2) is executed as below.

First of all, the RAID controller 30 (FIG. 1) performs data read operations 70 and 71 so as to read data D10 and data D11 from those blocks of HDDs 21-0 and 21-1 designated by LBAi. Then, data D10 and data D11, which are read from HDDs 21-0 and 21-1 as a result of the data read operations 70 and 71, are subject to the exclusive OR (EXOR) operation 72. Data D12 obtained by this EXOR operation is written in the block of the corresponding stripe of HDD 21-2. If both D10 and D11 are non-parity data, this indicates that D12 is parity data. If one of D10 and D11 is parity data, D12 is non-parity data. In the example illustrated in FIG. 7, the operations described above are repeated, with the value of LBAi incremented from LBAi=0 (0000h) to LBAi=LBAe (00FFh). In the case where the disk array 200 of RAID5 level is rebuilt, the data which is restored in units of one stripe on the basis of the data stored in areas LBAi=0 (000h) to LBAi=LBAe (00FFh) of HDDs 21-0 and 21-1 is written in the newly employed HDD 21-2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An array controller for controlling a disk array with redundancy, the disk array including a plurality of disk drives, the array controller comprising:

a maximum address storage unit configured to store a maximum address, which is a maximum one of addresses of data-written areas of the disk drives;

a data restoration unit configured to perform data restoration, wherein if one of the disk drives malfunctions and the disk array is rebuilt, the data restoration unit generates data corresponding to the malfunctioning disk drive based on data stored in first areas of remaining disk drives and arranges the generated data in a second area, which corresponds to the first areas and which is part of a new disk drive used in place of the malfunctioning disk drive, the first area being defined between a start address of the remaining disk drives to the maximum address stored in the maximum address storage unit;

a write command execution unit configured to receive a write command, which includes an address indicating an area where data should be written, from a host that uses the disk array, and to execute the write command, the write command execution unit writing data designated by the write command in an area of at least one of the disk drives designated by the address included in the write command;

a maximum address determination unit configured to determine whether an address indicating an area where data is written by the write command execution unit has exceeded the maximum address stored in the maximum address storage unit; and a maximum address update unit configured to update the maximum address to an address greater than the maximum address if the address indicating the area where the data is written by the write command execution unit has exceeded the maximum address stored in the maximum address storage unit.

2. An array controller for controlling a disk array with redundancy, the disk array including a plurality of disk drives, the array controller comprising:

a maximum address storage unit configured to store a maximum address, which is a maximum one of addresses of data-written areas of the disk drives; and a data restoration unit configured to perform data restoration, wherein if one of the disk drives malfunctions and the disk array is rebuilt, the data restoration unit generates data corresponding to the malfunctioning disk drive based on data stored in first areas of remaining disk drives and arranges the generated data in a second area, which corresponds to the first areas and which is part of a new disk drive used in place of the malfunctioning disk drive, the first area being defined between a start address of the remaining disk drives to the maximum address stored in the maximum address storage unit;

wherein the maximum address stored in the maximum address storage unit is rounded based on a predetermined unit.

3. An array controller according to claim 2, further comprising:

a write command execution unit configured to receive a write command, which includes an address indicating an area where data should be written, from a host that uses the disk array, and to execute the write command, the write command execution unit writing data designated by the write command in an area of at least one of the disk drives designated by the address included in the write command;

a maximum address determination unit configured to determine whether a rounded write address, obtained by rounding the address indicating the area where data is written by the write command execution unit based on the predetermined unit, has exceeded the maximum address stored in the maximum address storage unit; and a maximum address update unit configured to update the maximum address to the rounded write address if the rounded write address has exceeded the maximum address stored in the maximum address storage unit.

4. A disk array-rebuilding method applied to an array controller for controlling a disk array with redundancy, the disk array including a plurality of disk drives, the method comprising:

sequentially reading data from normally-operating disk drives while incrementing a read address from a start address, the data being used for rebuilding the disk array when one of the disk drives malfunctions;

writing data, which corresponds to the data read from the normally-operating disk drives and is identical to the data stored in the malfunctioning disk drives, in a new disk drive to be used in place of the malfunctioning disk drive, such that the data is written in an area of an identical address to the malfunctioning disk drive;

determining whether the disk array has been rebuilt by checking whether the incremented address has exceeded the maximum address, which is a maximum address among addresses indicating data-written areas of the disk drives;

writing the data designated by a write command in the area of at least one disk drive designated by an address included in the write command, when a host that uses the disk array issues the write command, wherein the disk array is determined as having been rebuilt when the incremented address has exceeded the stored maximum address, and wherein the storing the maximum address includes determining whether an address indicating an area where the data has been written in accordance with the write command has exceeded the maximum address, and updating the maximum address to the address exceeding the maximum address.

* * * * *